United States Patent
Smith et al.

(10) Patent No.: US 8,098,924 B2
(45) Date of Patent: *Jan. 17, 2012

(54) METHOD AND APPARATUS FOR DETERMINING IF AN OPTICAL DISK ORIGINATED FROM A VALID SOURCE

(75) Inventors: Patrick Smith, Dublin (IE); Phelim O'Doherty, Dublin (IE); Sean McCarthy, Dublin (IE)

(73) Assignee: Fraudhalt Limited, Dublin (IE)

( * ) Notice: Subject to any disclaimer, the term of this patent is extended or adjusted under 35 U.S.C. 154(b) by 863 days.

This patent is subject to a terminal disclaimer.

(21) Appl. No.: 12/108,180

(22) Filed: Apr. 23, 2008

(65) Prior Publication Data

US 2008/0225663 A1  Sep. 18, 2008

Related U.S. Application Data

(63) Continuation of application No. 10/868,317, filed on Jun. 15, 2004, now Pat. No. 7,372,986.

(30) Foreign Application Priority Data

Jun. 16, 2003 (IE) .................................. S2003/0443

(51) Int. Cl.
*G06K 9/00* (2006.01)
*G01N 21/00* (2006.01)
(52) U.S. Cl. ...................... 382/141; 382/108; 356/237.1
(58) Field of Classification Search .................. 382/100, 382/141, 108; 250/559.01, 559.2, 559.39; 356/237.1
See application file for complete search history.

(56) References Cited

U.S. PATENT DOCUMENTS

| | | | |
|---|---|---|---|
| 5,615,061 A * | 3/1997 | Singh ............................... 360/60 |
| 5,974,150 A * | 10/1999 | Kaish et al. ................... 713/179 |
| 7,372,986 B2 * | 5/2008 | Smith et al. ................... 382/141 |
| 7,693,336 B2 * | 4/2010 | O'Doherty et al. ........... 382/232 |

* cited by examiner

*Primary Examiner* — John Strege
(74) *Attorney, Agent, or Firm* — Brian Michaelis; Seyfarth Shaw LLP

(57) ABSTRACT

A method and apparatus for determining if an optical disk originated from a valid source, the method and apparatus scanning one major surface of the optical disk for imperfections, storing the locations of the imperfections relative to a datum, comparing a parameter of each of the locations of the imperfections with corresponding parameters of a master disk of known source for determining if the disk originated from the source from which the master disk originated.

6 Claims, 2 Drawing Sheets

METHOD AND APPARATUS FOR DETERMINING IF AN OPTICAL DISK ORIGINATED FROM A VALID SOURCE

CROSS REFERENCES TO RELATED APPLICATION DATA

This application is a continuation of U.S. patent application Ser. No. 10/868,317, filed on Jun. 15, 2004, which claims priority from Irish Patent Application No. S2003/0443, filed Jun. 16, 2003, which is incorporated herein by reference.

FIELD OF THE INVENTION

The present invention relates to a method and apparatus for determining if an optical disk originated from a valid source.

BACKGROUND OF THE INVENTION

Due to the ready availability of duplicating equipment, counterfeiting of optical disks, in particular, counterfeiting of CD-ROMs and music CDs is becoming a major problem on a global scale. With the ever increasing sophistication of duplicating equipment, in general, it is virtually impossible to identify counterfeit software on CD-ROMs. Similar problems arise in connection with counterfeit music CDs.

SUMMARY OF THE INVENTION

The present invention is directed towards providing a method and apparatus for determining if an optical disk originated from a valid source.

According to the invention there is provided a method and apparatus for determining if an optical disk originated from a valid source, the method and apparatus scanning one major surface of the optical disk for mechanical surface imperfections, storing the locations of the surface imperfections relative to a datum, comparing a parameter of each of the locations of the surface imperfections with corresponding parameters of a master disk of known source for determining if the disk originated from the source from which the master disk originated.

In one embodiment of the invention the major surface of the disk which is scanned is the surface through which laser light is passed to the reflective surface for reading recorded data on the optical disk.

In another embodiment of the invention the major surface of the disk is scanned using dark field scanning. Preferably, scanning of the major surface is carried out by directing light towards the major surface at a relatively small angle to the major surface, so that only light incident on a surface imperfection is reflected at an angle substantially perpendicular to the major surface. Preferably, the light directed towards the surface is directed at an angle in the range of 0° to 30° to the major surface.

In one embodiment of the invention light reflected from surface imperfections on the major surface is reflected to a camera, and preferably, to a digital camera. Ideally, the disk is mounted relative to the digital camera so that one of the disk and the digital camera is moveable relative to the other in X-Y directions perpendicular to each other for facilitating scanning of the entire surface of the disk.

In one embodiment of the invention the locations of the surface imperfections are stored by their respective X-Y co-ordinates relative to the datum, and the X-Y co-ordinates are subsequently converted into angular co-ordinates of the disk. In another embodiment of the invention the parameters of the locations are sequentially compared with corresponding stored parameters of master disks until a match has been made.

In one embodiment of the invention the datum for the disk being scanned is established relative to one of the surface imperfections, and the comparison with each master disk is made, commencing with the established datum position, and in the absence of a match, a new datum based on another surface imperfection of the disk being scanned is established and the parameters of the disk are compared with the corresponding parameters of the master disks, and preferably each surface imperfection is used as a datum.

Alternatively, the surface imperfections at each of a plurality of radii are integrated over 360° of the disk of each radius.

Additionally the invention provides apparatus for determining if an optical disk originated from a valid source, the apparatus comprising a scanning means for scanning a major surface of the disk for detecting mechanical surface imperfections, a computing means for computing the location of each surface imperfection, a secondary storing means for storing the locations of the surface imperfections, and a means for providing access to a primary storing means which stores parameters of locations of surface imperfections of master disks from known sources, and a comparing means for comparing parameters of the stored locations of the disk being scanned with corresponding parameters of the master disks for determining if the disk originated from a valid source.

In one embodiment of the invention the computing means comprises a computer.

In another embodiment of the invention the scanning means comprises a platform capable of planar movement in X-Y directions, and a camera for capturing images of surface imperfections.

In one embodiment of the invention the scanning means comprises a dark field scanner, and the dark field scanner comprises a means for directing light at the major surface of the disk at a relatively small angle to the major surface, and preferably, at an angle in the range of 0° to 30°, so that only light incident on a surface imperfection is reflected to the camera, and preferably, is reflected substantially perpendicularly from the major surface.

In one embodiment of the invention the camera is a digital camera comprising a 1,000 by 1,000 matrix of pixels, and ideally, the pixels are of 10 microns in size.

In a further embodiment of the invention the camera is capable of 2× to 10× magnification of the image, and preferably 2× to 5× magnification.

In a still further embodiment of the invention the computer carries out the comparison between the parameters of the disk and the corresponding parameters of the master disk.

Advantages of the method and apparatus according to the invention include provision of optical medium inspection for accurate determination of the source of the optical medium. A high speed inspection and magnification method and apparatus is provided for reducing substantially the incidence of optical media and software piracy.

BRIEF DESCRIPTION OF THE DRAWINGS

The foregoing and other features and advantages of the invention will be more clearly understood from the following description of an embodiment thereof, which is given by way of example only, with reference to the accompanying drawings, in which.

Figure 1:
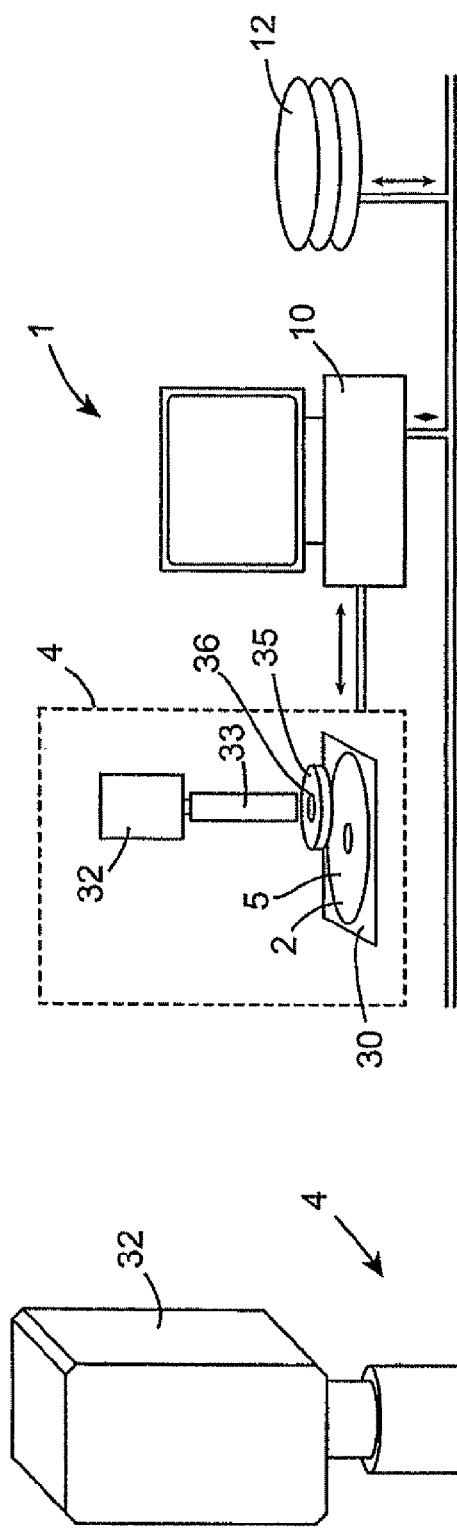
FIG. 1 is a diagrammatic representation of apparatus according to the invention for determining if an optical disk originated from a valid source.
Figure 2:
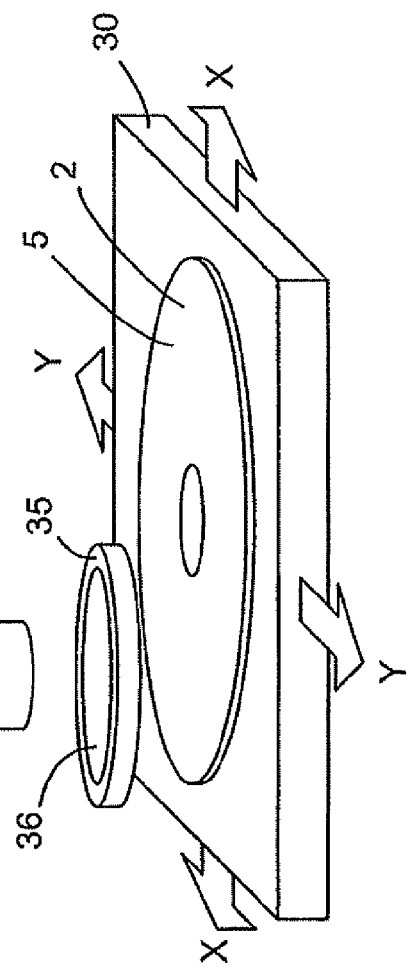
FIG. 2 is a perspective view of a portion of the apparatus of FIG. 1.

Referring to the drawings and initially to FIGS. 1 and 2, there is illustrated apparatus according to the invention, indicated generally by the reference numeral 1, for determining if an optical disk, in this embodiment of the invention a CD-ROM disk 2, originated from a valid source. The apparatus 1 comprises a dark field microscopy scanner 4 for scanning the disk 2, the validity of the origin of which is to be determined. The scanner 4, as will be described below, scans a major surface 5 of the disk 2 for identifying mechanical surface imperfections on the major surface 5, such as the imperfection 8 of the disk 2 illustrated in FIG. 4. In this embodiment of the invention the major surface 5 being scanned is the surface through which laser light is passed to the reflective surface 9 of the disk 2. A computing means, in this embodiment of the invention a PC 10 computes and stores the angular locations of the surface imperfections 8. On completion of a scan of the disk 2 the PC 10 then compares a parameter of the location of each surface imperfection with a corresponding parameter of surface imperfections of master disks stored in a primary store, namely, a read-only memory (ROM) 12 for determining if the disk 2 has originated from a valid source. The apparatus 1 and its operation will be described in more detail below, however, before proceeding to describe the apparatus 1 further, the compact disk 2 will first be described in more detail with reference to FIGS. 3 and 4.

The CD-ROM disk 2 comprises a transparent layer 15 of polycarbonate material through which laser light in use is passed to a reflective layer 16 which contains the data to be read from the CD-ROM disk 2. A label side layer 17 also of polycarbonate material is laminated to the reflective layer 16. Thus, the CD-ROM disk 2 comprises the major surface 5 on the transparent polycarbonate layer 15, and a major surface 18 on the label side 17. However, for the purpose of the invention only the major surface 5 on the transparent polycarbonate layer 15 is relevant. The CD-ROM disk 2 has an outer border area 20 and an inner border area 21 on which no data is recorded. A data recorded area 24 located between the inner and outer border areas 20 and 21 contains the recorded data. In this embodiment of the invention only the data recorded area 24 is scanned for mechanical surface imperfections. It has been found that mechanical presses, in which CD-ROM disks 2 are pressed, impress surface imperfections on the transparent major surface of the CD-ROM disks. These surface imperfections result from corresponding imperfections in pressing plates of the presses, and effectively form a fingerprint from which all disks pressed on a particular press can be identified. The present invention is based on this fact that each press impresses a corresponding identical pattern of surface imperfections on all disks pressed on that press.

Returning now to the apparatus 1, and referring in particular to FIGS. 1 and 2, the scanner 4 comprises a platform 30 on which the disk 2 to be scanned is secured. The platform 30 is incrementally moveable in X and Y directions for facilitating a complete scan in incremental steps of the major surface 5 of the disk 2. A camera 32, in this embodiment of the invention a digital camera, is fixedly mounted above the platform 30, and a lens 33 which provides a magnification of between 2× and 10× magnifies the image of a scanned area to the camera 32. A dark field light source provided by an annular light source 35 is located beneath the camera 32, and is co-axially aligned with the lens 33, so that light reflected perpendicularly from the major surface 5 of the disk 2 passes through a central opening 36 of the annular light source 35 to the lens 33. The annular light source 35 in this embodiment of the invention comprises a plurality of light emitting diodes which are arranged to emit light radially towards a central axis defined by the annular light source 35 at a relatively small angle to the major surface 5, which in this embodiment of the invention is approximately 30° to the major surface 5.

Figure 4:
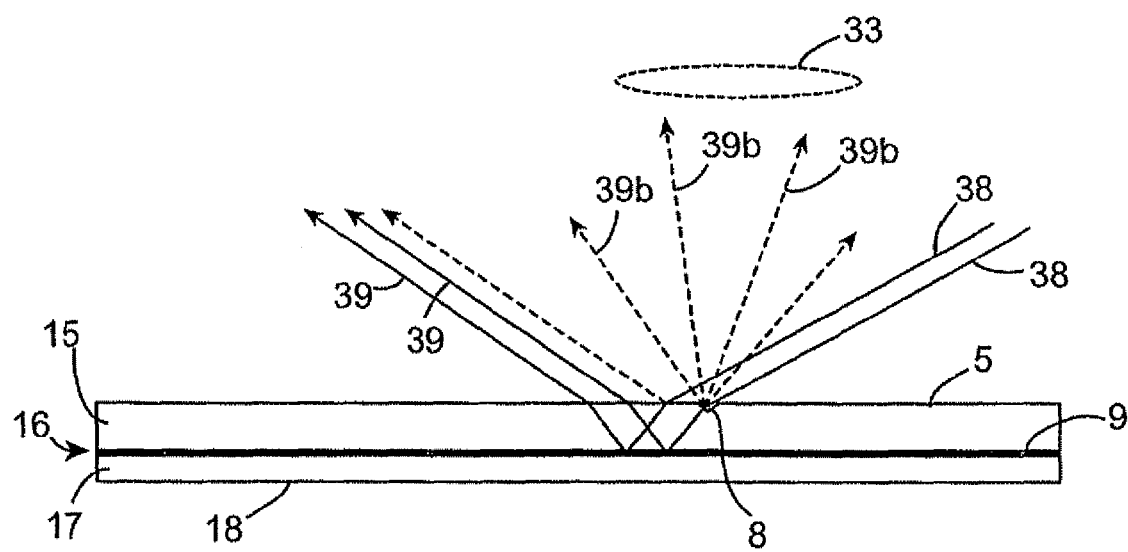
FIG. 4 is a transverse cross-sectional side elevational view of the optical disk of FIG. 3.

Light indicated by light rays 38 in FIG. 4 incident on the major surface 5 is refracted into the transparent layer 15 to the reflective layer 16 of the disk 2 and is reflected from the reflective surface 9 formed by the reflective layer 16 through the major surface 5 at an angle to the major surface 5 substantially similar to the angle of incidence of the rays 38 to the major surface 5. The reflected light is illustrated by the light rays 39. However, light from the annular light source 35 incident on a surface imperfection 8 is reflected substantially perpendicularly to the major surface 5 by the imperfection through the central opening 36 of the annular light source 35 to the lens 33, and in turn to the camera 32, see the reflected rays 39b in FIG. 4.

Figure 3:
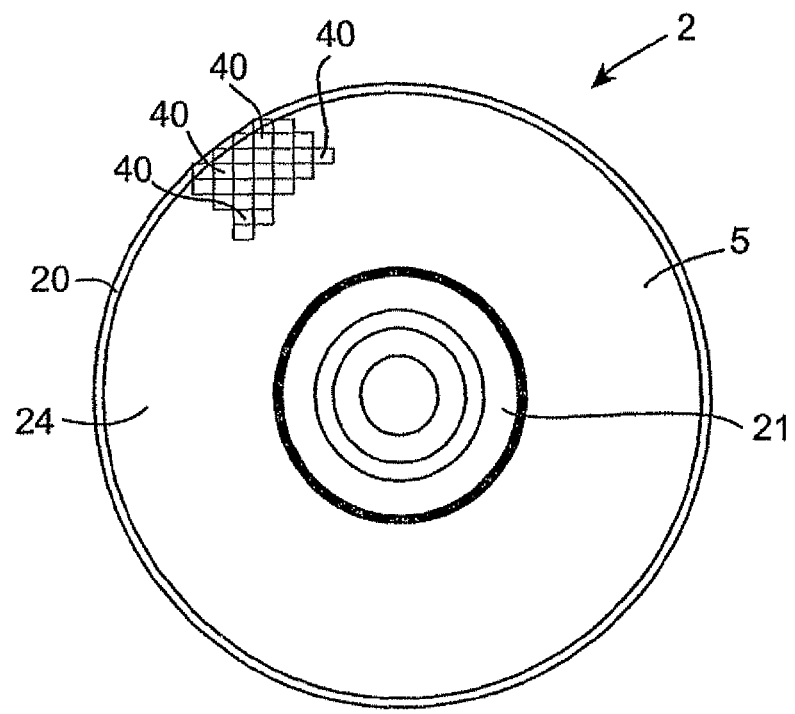
FIG. 3 is a top plan view of an optical disk.

The camera 32 is a high resolution CCD camera having a matrix of pixels of the order of $1,000^2$ of approximately 10 microns size, and when the magnification of the lens 33 is set between 2× and 5× an image 40 of approximately 2 mm to 5 mm square of the disk 2 is captured, see FIG. 3. As each image 40 is captured, the platform 30 is incremented in the appropriate X or Y direction to capture the next adjacent image 40 until the entire data recorded area 24 has been scanned. On completion of the scanning the individual image frames 40 are then pieced together by the PC to form a full map of the major surface 5 of the disk 2 which includes all the detected surface imperfections 8 and their locations on the major surface 5. The map of the major surface 5 is stored in the PC.

At this stage, any one of a number of suitable algorithms may be used for comparing the map of the major surface 5 with corresponding maps of master disks of known sources which are stored in the ROM 12 for determining if the disk 2 originated from one of the valid sources. One particularly suitable algorithm requires integrating the surface imperfections over 360° of the disk 2 at each of a number of radii from the centre of the disk 2 and comparing the integrated values at each of the radii with corresponding integrated values of the master disks to establish if a match exists. Typically, the surface imperfections are integrated over the 360° of the disk at each radius in incremental steps of 2 μm to 5 μm (object pixel size) from the inner radius of the data recorded area 24 to the outer radius of the data recorded area 24. If a match is found, then the disk 2 is deemed to have originated from a valid source. In the absence of a match being found, then the disk is deemed to be of unknown origin, and possibly counterfeit.

The PC 10 is programmable to facilitate entry and storage of additional maps of master disks, as new CD-ROM disk presses come on stream. Typically, a plurality of master disks from the same press, for example, 10 to 100 disks are scanned by the apparatus 1, and the map of the major surface of each disk is stored. Depending on the algorithm used for comparing a disk with the master disk, appropriate parameters of the locations of the imperfections are averaged over the scanned disks, and the average is then stored in an additional ROM. If, for example, the algorithm for determining if a disk originated from a valid source or otherwise is that which has already been described, the integrated values of the imperfections over the 360° of the disks at the respective radii are averaged for each radius, and the respective averages for each radius is stored.

In general, it is envisaged that it may not be possible to identify a specific datum for each disk to be tested with a datum for a master disk, and in which case, the algorithm for comparing a disk with the master disks just described is a particularly suitable algorithm. However, if it were possible to identify a specific datum for each master disk and a corresponding datum on the disk of the disk being tested, then the angular and radial locations of the respective imperfections 8 of the disk being tested can be determined from the angular datum and compared with corresponding imperfections from a corresponding angular datum on the master disk.

In use, where it is desired to determine if a disk originated from a valid source, the apparatus 1 is operated in a test mode, and the disk 2 is placed on the platform 30. The disk 2 is then scanned by the camera 32 as the platform 30 is incremented in the X and Y directions until a complete map of the data recorded area 24 of the major surface 5 of the disk 2 has been made and recorded in the PC 10. Depending on the comparison algorithm being used, the PC 10 then compares the appropriate parameters of the stored map of the disk 2 with corresponding parameters of master disks stored in the ROM 12. If a match is found, then the disk 2 is determined as having originated from a valid source. In the absence of a match, the disk is determined as being of unknown origin, and possibly counterfeit.

Where it is desired to store further master maps or master parameters of master CD-ROMs of known sources, the apparatus 1 is operated in new entry mode, and a plurality of disks, typically, 10 to 100 disks from a known source are scanned as already described and a map of the data recorded area 24 of the major surface 5 of each disk 2 is prepared and stored in the PC 10. Appropriate parameters of the surface imperfections of the scanned disks are averaged and stored in a new ROM 12.

While the apparatus has been described as comprising a ROM which stores maps of the relevant major surface of master disks of known source, it is envisaged that in certain cases the apparatus may not include the store of data of master disks, but rather, the master disk data would be stored centrally, and the apparatus according to the invention would be able to access such a central store over a suitable communication link, for example, through a telecommunication network, the internet, or otherwise.

It is also envisaged that as disks of unknown origin are confirmed as being counterfeit, a master map or master parameters of the counterfeit disk may also be stored in the apparatus or centrally. Thus, the apparatus could also compare disks, the source of which is being determined with the master map or master parameters of the counterfeit disk in order to confirm if a disk of unknown source can be confirmed as being counterfeit.

While particular algorithms for comparing the parameters of surface imperfections of a disk with those of master disks have been described, any of various other suitable algorithms may be used.

Although the invention is described herein for determining if a CD-ROM originated from a valid source it should be appreciated that the invention could be applied to other media and packaging, such as tape and video packaging or other packaging for content that originates from a source with distinctly identifiable physical characteristics.

While the method and apparatus described herein involves use of imperfections on a major surface of an optical disk, it should be appreciated that sub-surface imperfections or other mechanical characteristics of other surfaces may be considered.

The invention is not limited to the embodiments hereinbefore described, which may be varied in construction and details and the foregoing and various other changes, additions or deletions in the form and function of the apparatus and method described herein and recited in the claims may be made without departing from the spirit and scope of the invention.

What is claimed:

1. A method for determining if media originated from a valid source, the method comprising the steps of:
    scanning a surface of the media for imperfections;
    storing the locations of the imperfections relative to a datum, wherein locations of the imperfections are coordinates relative to the media;
    comparing a parameter of each of the locations of the imperfections with corresponding parameters of a master media of known source for determining if the media originated from the source from which the master media originated.

2. The method according to claim 1, wherein the media is an optical disk and the surface of the disk which is scanned is a surface through which laser light is passed to the reflective surface for reading recorded data on the optical disk.

3. The method according to claim 1, wherein light reflected from imperfections on the surface is reflected to a camera.

4. The method according to claim 1, wherein locations of the imperfections are stored by respective X-Y coordinates relative to the datum, and the X-Y coordinates are subsequently converted into angular co-ordinates of the disk.

5. An apparatus for determining if media originated from a valid source, the apparatus comprising:
    a scanning means for scanning a surface of the media for detecting imperfections;
    a computing means for computing the location of each surface imperfection;
    a secondary storing means for storing the locations of the surface imperfections; and
    a means for providing access to a primary storing means which stores parameters of locations of surface imperfections of master media from known sources;
    and a comparing means for comparing parameters of the media being scanned with corresponding parameters of the master media for determining if the media originated from a valid source.

6. The apparatus according to claim 5, wherein the scanning means comprises a platform capable of planar movement in X-Y directions, and a camera for capturing images of surface imperfections.

* * * * *